United States Patent
Lohr et al.

(10) Patent No.: US 9,540,997 B2
(45) Date of Patent: Jan. 10, 2017

(54) ENGINE COVER INTEGRATED CAPTIVE FASTENER

(71) Applicant: Ford Global Technologies, LLC, Dearborn, MI (US)

(72) Inventors: John Carl Lohr, Beverly Hills, MI (US); Sandra Davidson Osip, Livonia, MI (US); Todd Rakus, Windsor Ontario (CA)

(73) Assignee: Ford Global Technologies, LLC, Dearborn, MI (US)

( * ) Notice: Subject to any disclaimer, the term of this patent is extended or adjusted under 35 U.S.C. 154(b) by 277 days.

(21) Appl. No.: 14/219,078

(22) Filed: Mar. 19, 2014

(65) Prior Publication Data

US 2015/0267609 A1    Sep. 24, 2015

(51) Int. Cl.
*F02B 77/02* (2006.01)
*F02F 7/00* (2006.01)
*F16M 1/026* (2006.01)
*F02B 77/11* (2006.01)

(52) U.S. Cl.
CPC ........... *F02B 77/02* (2013.01); *F02B 77/11* (2013.01); *F02F 7/0082* (2013.01); *F16M 1/026* (2013.01); *Y10T 29/49231* (2015.01)

(58) Field of Classification Search
CPC ........... F02B 77/02; F02B 77/11; F16M 1/00; F16M 1/02; F16M 1/026; F16B 43/00; F16B 5/0233; F02F 7/005; F02F 7/0065; F02F 7/0068; F02F 7/0082; Y10T 29/49231
USPC . 123/195 C, 198 E; 411/546, 508, 509, 510, 411/368
See application file for complete search history.

(56) References Cited

U.S. PATENT DOCUMENTS

| | | | | | |
|---|---|---|---|---|---|
| 4,456,268 | A | * | 6/1984 | Penn | F02B 77/00 277/598 |
| 4,975,008 | A | * | 12/1990 | Wagner | F02B 77/00 411/337 |
| 5,094,579 | A | * | 3/1992 | Johnson | F02B 77/00 411/107 |
| 5,255,647 | A | * | 10/1993 | Kiczek | F02F 7/006 123/195 C |

(Continued)

OTHER PUBLICATIONS

EJOY GmbH & Co. KG, Industrial Fasteners Division, EJOT Multifunctional EJOT Components, Products Brochure, pp. 1-14.

*Primary Examiner* — Grant Moubry
(74) *Attorney, Agent, or Firm* — LeClairRyan

(57) ABSTRACT

An engine cover assembly having an integrally attached captive fastener or part-in-assembly fastener for attachment to an engine is disclosed. The engine cover assembly includes an engine cover having a fastener aperture formed in a recessed area thereof and a captive fastener assembly integrally attached to the cover. The captive fastener assembly includes an elongated fastener having a head or shoulder, a load limiting spacer disposed next to the shoulder of the elongated fastener, and a load limiter positioned next to the load limiting spacer. The load limiter has shoulders formed at both ends. The elongated fastener has a threaded end for attachment to a threaded insert positioned in the engine. Insulators are attached to the load limiting spacer and are positioned to either side of an area of the engine cover adjacent the fastener aperture, thus capturing the engine cover between the elongated fastener head and the load limiter.

20 Claims, 3 Drawing Sheets

(56) References Cited

U.S. PATENT DOCUMENTS

| | | | | |
|---|---|---|---|---|
| 5,364,109 A | * | 11/1994 | Sihon | F02F 7/006 277/592 |
| 5,513,603 A | * | 5/1996 | Ang | F02F 7/006 123/198 E |
| 6,280,132 B1 | * | 8/2001 | Szczukowski | F02F 7/006 411/107 |
| 6,591,801 B1 | | 7/2003 | Fonville | |
| 6,834,822 B2 | | 12/2004 | Koning et al. | |
| 7,040,268 B1 | * | 5/2006 | Fonville | F02F 7/006 123/90.37 |
| 7,275,513 B2 | | 10/2007 | Nonogaki et al. | |
| 7,571,704 B2 | * | 8/2009 | Fujima | F02N 15/006 123/195 E |
| 7,610,893 B2 | | 11/2009 | Waters et al. | |
| 7,682,117 B2 | * | 3/2010 | Holt | F02M 55/025 403/408.1 |
| 7,708,512 B2 | * | 5/2010 | McLean | F16B 41/002 411/533 |
| 7,753,633 B2 | * | 7/2010 | Genick, II | F16B 5/025 411/369 |
| 7,797,936 B2 | * | 9/2010 | Hayashi | F01D 25/16 411/395 |
| 2005/0025566 A1 | * | 2/2005 | Hasegawa | F16B 5/0233 403/408.1 |
| 2012/0247420 A1 | | 10/2012 | Griffiths et al. | |

\* cited by examiner

US 9,540,997 B2

ENGINE COVER INTEGRATED CAPTIVE FASTENER

TECHNICAL FIELD

The disclosed inventive concept relates generally to covers for vehicle engines. More particularly, the disclosed inventive concept relates to an engine cover assembly having an integrated captive fastener and to a method of attaching the engine cover assembly to the engine.

BACKGROUND OF THE INVENTION

The engine compartment of the modern vehicle has an appearance that is quite different from that of its predecessors. For decades following the introduction of the motor vehicle, the engine compartment was generally ignored by designers who, instead, focused on the exterior and interior of the vehicle. The engine compartment of the production vehicle (as opposed to the show vehicle) was left entirely to engineers and thus was solely functional.

Nowadays, however, designers are engaged to improve the overall appearance of the engine compartment. The general result of these efforts is the inclusion in the engine compartment of an engine cover that covers at least some of the vehicle's engine. Known covers have a variety of shapes and styles and vary in the degree to which they cover the engine.

Known methods for attaching the engine cover to the engine itself include fitting stud bolts to strategic locations on the engine, applying appropriate torque to the stud bolts, installing the engine cover, and running down attachment nuts to secure the engine cover in position. These steps add to production time and, ultimately, play a role in increasing final product cost.

Accordingly, a common challenge for the designer of the modern engine cover is the need to combine functionality and serviceability with aesthetics in the relatively small space typically provided in the modern engine compartment. Consideration must therefore be given to ease of installation to maintain competitive assembly costs and ease of removability to maintain competitive repair costs. In addition to satisfying these requirements, the attachment elements for allowing easy installation and removal must also be simple, relatively light weight, inexpensive to produce, and integrated with the cover itself.

As in so many areas of vehicle technology there is always room for improvement related to the design of engine covers and to their methods of installation.

SUMMARY OF THE INVENTION

The disclosed invention overcomes the problems of known engine covers and methods for attaching the covers to the engine. Particularly, the disclosed inventive concept comprises an engine cover assembly having an integrally attached captive fastener or part-in-assembly fastener for attachment to an engine.

The engine cover assembly includes an engine cover having a fastener aperture formed in a recessed area thereof and a captive fastener assembly integrally attached to the engine cover. The captive fastener assembly includes an elongated fastener having a fastener head or shoulder, a load limiting spacer disposed next to the shoulder of the elongated fastener, and a load limiter positioned next to the load limiting spacer. The load limiter has shoulders formed at both ends.

The elongated fastener has a threaded end for threaded insertion into a threaded insert positioned in the engine. The length of the elongated fastener may be selected from different lengths as may be best suited for a particular application.

Insulators, such as rubber insulators, are attached to the load limiting spacer and are positioned to either side of an area of the engine cover adjacent the fastener aperture. Thus the engine cover is captured between the insulators, the elongated fastener head or shoulder, and one of the shoulders of the load limiter.

The captive and integral nature of the fastener assembly of the disclosed inventive concept relative to the engine cover overcomes the limitations of known engine covers and methods of attaching such covers. By incorporating the fastener assembly and the engine cover, the five individual steps of installing the stud bolt into the engine, torqueing the stud bolt, installing the engine cover, then attaching and running down a nut on the stud bolt according to known methods of attaching current engine covers are reduced to only two steps, placing the engine cover assembly over the engine and running down the elongated fasteners. As normally there are at least two fasteners used for attaching the engine cover to the engine, considerable assembly time is saved by eliminating three steps per fastener.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
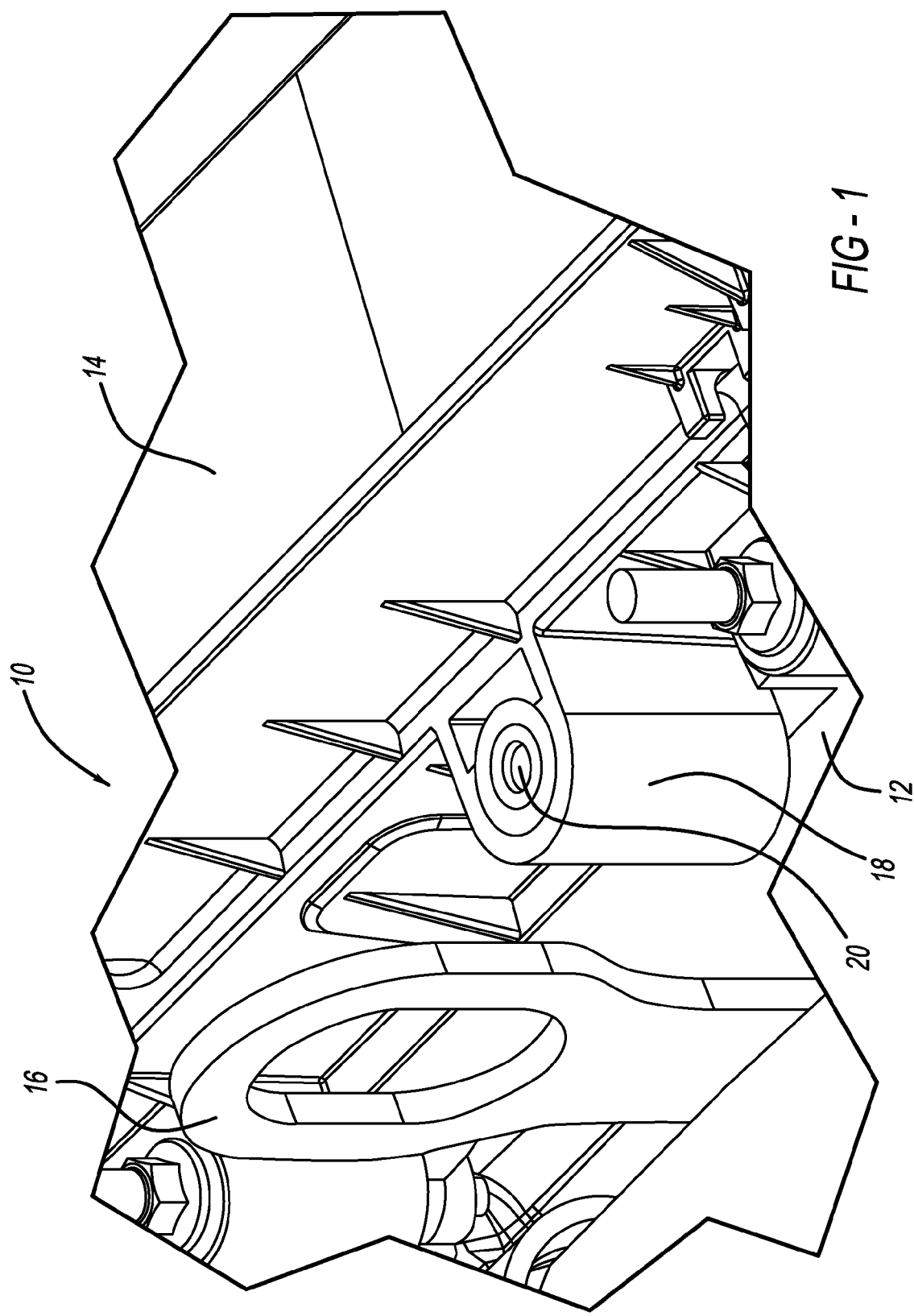
FIG. 1 is a perspective view of a portion of an engine without the cover illustrating the general area to which the engine cover assembly of the disclosed inventive concept is attached.

In the following figures, the same reference numerals will be used to refer to the same components. In the following description, various operating parameters and components are described for different constructed embodiments. These specific parameters and components are included as examples and are not meant to be limiting.

Referring to FIG. 1, a perspective view of a portion of an engine, generally illustrated as 10, is shown without an engine cover assembly of the disclosed inventive concept. The engine 10 includes a portion of an engine block 12, a portion of a cam cover 14 and an adjacent engine lifting eye 16. Because of the relatively close proximity of the cam cover 14 to the engine lifting eye 16, little room is allowed for the practical installation of the conventional stud and nut assembly for attachment of the engine cover. It is to be understood that the arrangement and configuration of the engine 10 and the cam cover 14 are only illustrative and that alternative arrangements and configurations may be adopted without deviating from the underlying inventive concept as disclosed.

In response to the limited clearances available in the engine 10 and the associated cam cover 14, a cam cover boss 18 is formed with the cam cover 14. The shape and placement of the cam cover boss 18 as shown in FIG. 1 are only suggestive and are not intended as being limiting. In addition, while only one cam cover boss 18 is illustrated in FIG. 1, it is to be understood that a plurality of similar cam cover bosses may be fitted to the cam cover 14 as needed for proper attachment of the engine cover assembly. In addition, attachment bosses may be attached to the engine 10 in other locations (not shown), also as needed for proper attachment of the engine cover assembly.

The cam cover boss 18 is provided for attachment of the engine cover assembly of the disclosed inventive concept, discussed below and in relation to FIGS. 1 and 2. The cam cover boss 18 includes a fastener hole 20 centrally formed therein for receiving a threaded fastener as discussed below with respect to FIGS. 2 and 3.

Figure 2:
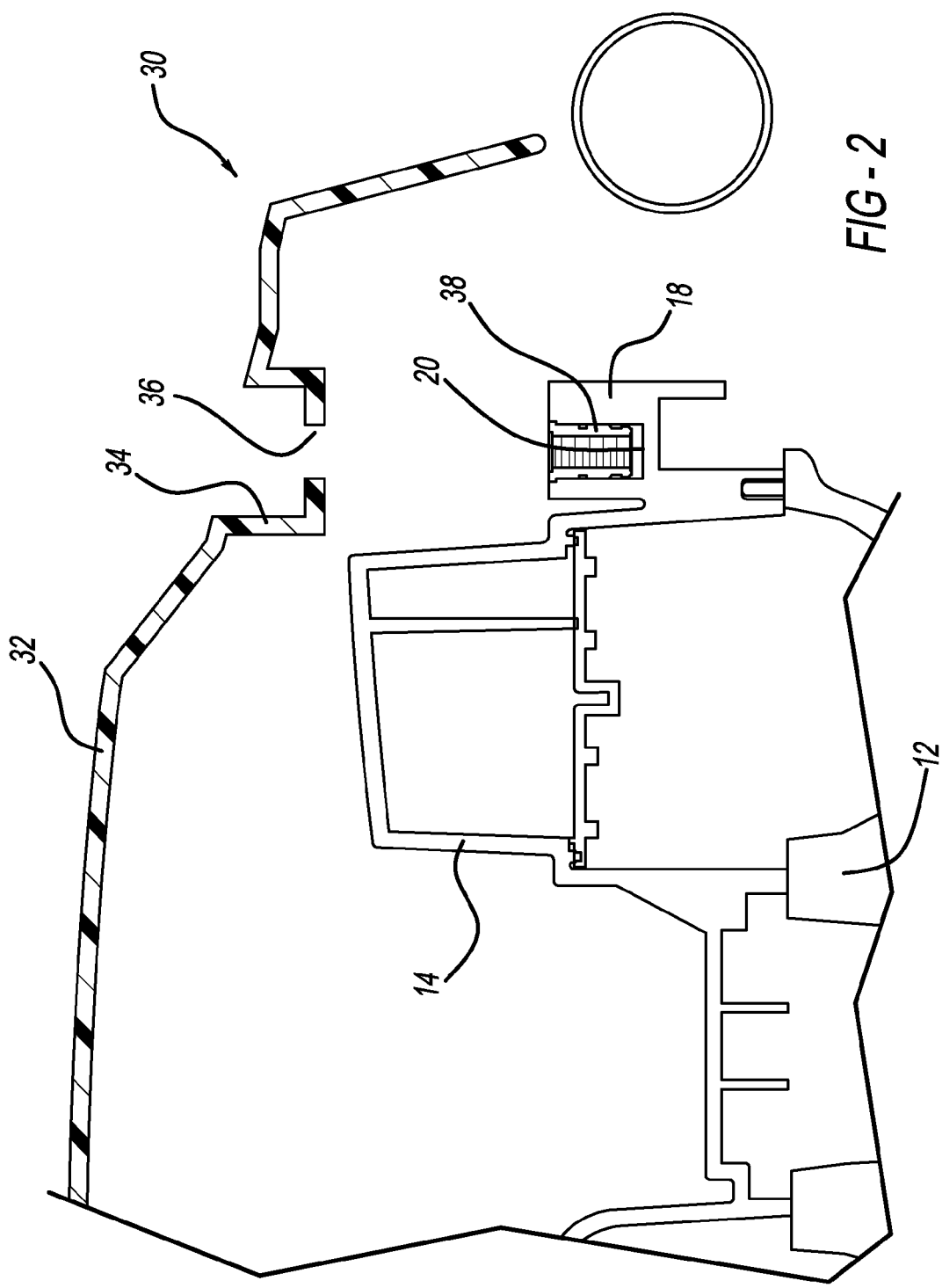
FIG. 2 is a sectional view of the engine cover of the engine cover assembly of the disclosed inventive concept in position relative to the upper portion of the vehicle engine.

FIG. 2 discloses a sectional view of an engine cover assembly and engine arrangement according to the disclosed inventive concept, generally illustrated as 30. The engine cover assembly and engine arrangement 30 includes an engine cover 32 fitted over the engine 10. The engine cover 32 includes a recessed area 34 formed therein. A fastener-retaining aperture 36 is formed in the recessed area 34. While a single recessed area 34 is illustrated in FIG. 2 it is to be understood that a plurality of recessed areas may be formed in the engine cover 32 as needed for proper attachment of the engine cover 32 to the engine 10.

A threaded fastener insert 38 is fitted in the fastener hole 20 formed in the cam cover boss 18. The threaded fastener insert 38 may be formed from any one of several materials including, for example, a plastic or a metal.

As illustrated in FIG. 2, a substantial air gap exists between the upper surface of the cam cover boss 18 and the lower surface of the recessed area 34. It is not possible as a practical engineering matter to bring the engine cover 32 into contact with the cam cover boss 18. Accordingly, a fastener assembly is required that not only securely attaches the engine cover 32 to the engine 10 but also to provide structural support between the upper surface of the cam cover boss 18 and the lower surface of the recessed area 34.

Figure 3:
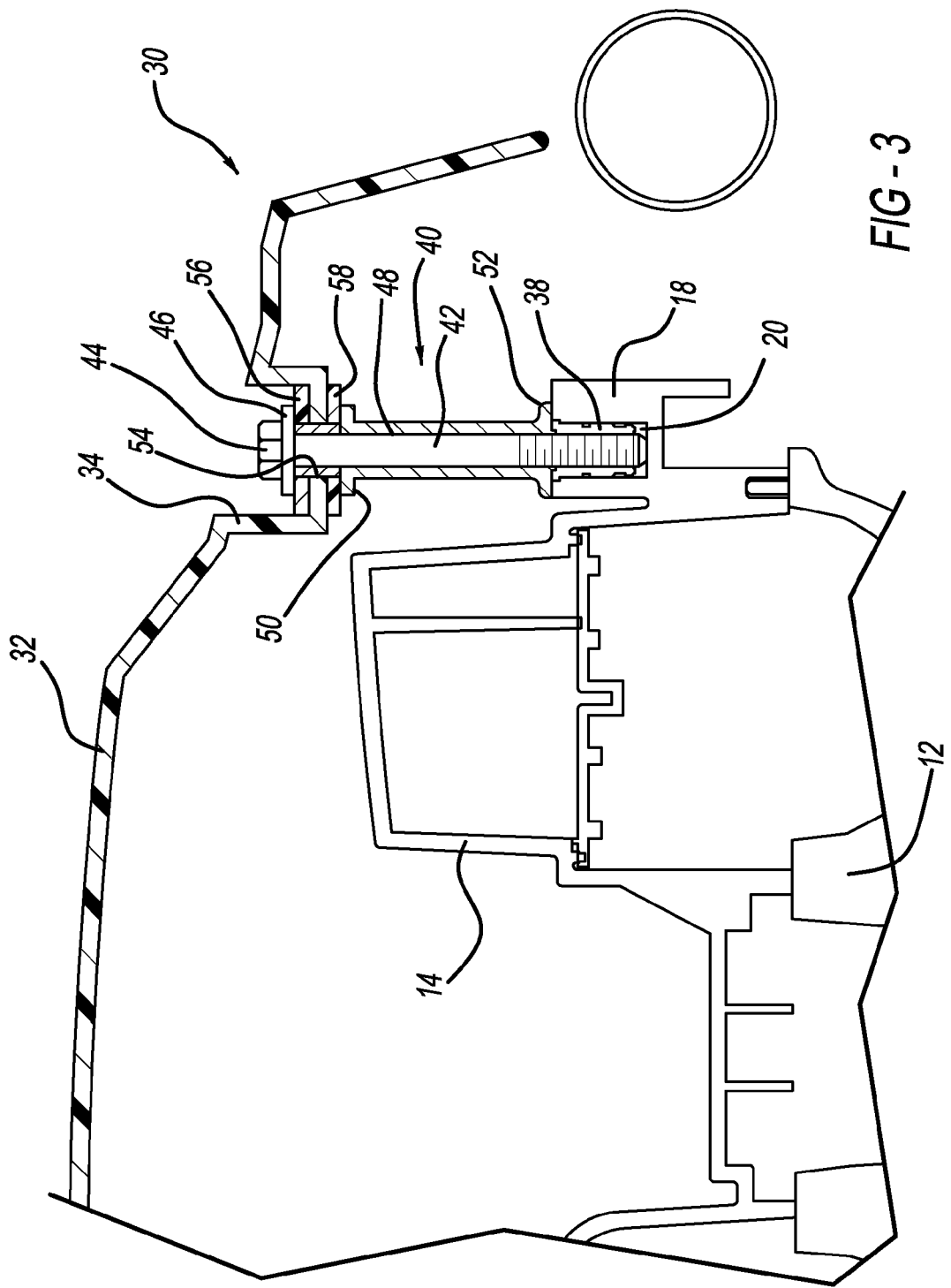
FIG. 3 is a sectional view similar to that of FIG. 2 but illustrating the fastener assembly in position attached to the engine.

FIG. 3 illustrates the provision of a fastener assembly, generally illustrated as 40, that fills both the requirement of the fastening of the engine cover 32 to the engine 10, via the cam cover boss 18, and the provision of the needed structural support to fill the air gap created between the two. The fastener assembly 40 is captive with respect to the engine cover 32 and is included as a part-in-assembly such that the engine cover 32 and the fastener assembly 40 form a single assembly that is attached to the engine 10 during vehicle assembly without the need for attaching a stud fastener to the engine 10.

The fastener assembly 40 includes an elongated fastener 42, such as an M6 fastener, although other fasteners may be suitable for the desired purpose. The elongated fastener 42 may also include any of a variety of heads, such as a Torx (trademark) button-head or a bolt-head 44 as illustrated. Regardless of the embodiment fastener head, a shoulder 46 is formed on the underside of the fastener head 44.

To provide the needed structural support created by the air gap formed between the upper surface of the cam cover boss 18 and the lower surface of the recessed area 34, a load limiter 48 is positioned therebetween. The load limiter 48 may be formed from a variety of materials, including metal, and includes an upper shoulder 50 and a lower shoulder 52. The outer side of the lower shoulder 52 rests against the upper surface of the cam cover boss 18.

In addition to the load limiter 48, structural support is also provided in the fastener assembly 40 by the provision of a spacer 54 that is fitted through the fastener-retaining aperture 36 and between the underside of the shoulder 46 and the outer side of the upper shoulder 50 of the load limiter 48. The spacer 54 also functions as a load limiter.

An upper insulator 56 is provided between the underside of the shoulder 46 of the elongated fastener 42 and the outer side of the recessed area 34. A lower insulator 58 is provided between the outer surface of the upper shoulder 50 and the inner side of the recessed area 34. The insulators 56 and 58 may be made from any one of several possible insulating materials, such as rubber. The spacer 54 passes through middles of both the upper insulator 56 and the lower insulator 58.

In use, the disclosed inventive concept provides a cost-effective and easy way of attaching an engine cover to an engine compared with known techniques. By providing an engine cover assembly according to the disclosed inventive concept that includes a captive attachment assembly, the number of production steps required to properly attach the engine cover assembly to the engine is significantly reduced. In the same manner, the number of steps needed to remove the engine cover assembly in case of engine is also reduced.

Thus, the disclosed invention as set forth above overcomes the challenges faced by known engine cover assemblies by increasing ease of assembly and ease of repair. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle engine assembly comprising:
an engine having a threaded insert;
an engine cover having a fastener aperture;
a fastener assembly integrally attached to said cover, said assembly comprising an elongated fastener for attachment to said insert, said fastener having a shoulder, a load limiter having first and second shoulders, a spacer fitted between said shoulder of said fastener and said first shoulder of said limiter, and an insulator fitted between said shoulder of said fastener and said cover.

2. The vehicle engine assembly of claim 1, wherein said spacer is a load limiting spacer.

3. The vehicle engine assembly of claim 1 wherein said fastener aperture is formed through a fastener portion of said engine cover and wherein said insulator is fitted between said shoulder of said elongated fastener and said fastener portion of said cover, said insulator being fitted around said spacer.

4. The vehicle engine assembly of claim 1 wherein said fastener aperture is formed through a fastener portion of said engine cover and wherein said insulator is fitted between said first shoulder of said load limiter and said fastener portion of said cover, said insulator being fitted around said spacer.

5. The vehicle engine assembly of claim 1 wherein said fastener aperture is formed through a fastener portion of said engine cover and wherein said insulator is fitted between said shoulder of said elongated fastener and said fastener portion of said cover and a second insulator fitted between said first shoulder of said load limiter and said fastener portion of said cover, said insulators being fitted around said spacer.

6. The vehicle engine assembly of claim 5 wherein said insulators are formed from rubber or a rubber-like material.

7. The vehicle engine assembly of claim 1 wherein said engine cover has a recessed area and wherein said fastener aperture is formed in said recessed area.

8. A cover assembly for a vehicle engine comprising:
an engine cover having a fastener aperture;
a fastener assembly integrally attached to said cover, said assembly comprising an elongated fastener having a shoulder, a load limiter having first and second shoulders, a spacer fitted between said shoulder of said fastener and said first shoulder of said limiter, and an insulator fitted between said shoulder of said fastener and said cover.

9. The vehicle engine assembly of claim 8, wherein said spacer is a load limiting spacer.

10. The cover assembly for a vehicle engine of claim 8 wherein said fastener aperture is formed through a fastener portion of said engine cover and wherein said insulator is fitted between said shoulder of said elongated fastener and said fastener portion of said cover, said insulator being fitted around said spacer.

11. The cover assembly for a vehicle engine of claim 8 wherein said fastener aperture is formed through a fastener portion of said engine cover and wherein said insulator is fitted between said first shoulder of said load limiter and said fastener portion of said cover, said insulator being fitted around said spacer.

12. The cover assembly for a vehicle engine of claim 8 wherein said fastener aperture is formed through a fastener portion of said engine cover and wherein said insulator is fitted between said shoulder of said elongated fastener and said fastener portion of said cover and a second insulator fitted between said first shoulder of said load limiter and said fastener portion of said cover, said insulators being fitted around said spacer.

13. The cover assembly for a vehicle engine of claim 12 wherein said insulators are formed from rubber or a rubber-like material.

14. The cover assembly for a vehicle engine of claim 8 wherein said engine cover has a recessed area and wherein said fastener aperture is formed in said recessed area.

15. A method for covering a vehicle engine comprising:
forming an aperture in the engine and positioning a threaded insert therein;
forming a cover assembly including a cover and a fastener assembly integrally attached thereto, said assembly comprising a fastener having a shoulder, a load limiter having a shoulder, a spacer fitted between said fastener shoulder and said limiter shoulder, and an insulator fitted between said shoulder of said fastener and said cover;
positioning said cover assembly over the engine; and
threading said fastener into said insert.

16. The method for covering a vehicle engine of claim 15, wherein said shoulder of said load limiter is a first shoulder, said load limiter including a second shoulder, and wherein said spacer is positioned against said first shoulder and said second shoulder is positioned against said aperture formed in the engine.

17. The method for covering a vehicle engine of claim 15, wherein said cover has a recessed area having a fastener-passing aperture formed therein and said fastener is fitted through said aperture.

18. The method for covering a vehicle engine of claim 17, wherein said fastener-passing aperture is formed through a fastener portion of said engine cover and wherein said insulator is fitted between said shoulder of said elongated fastener and said fastener portion of said cover, said insulator being fitted around said spacer.

19. The method for covering a vehicle engine of claim 17, wherein said fastener-passing aperture is formed through a fastener portion of said engine cover and wherein said insulator is fitted between said first shoulder of said load limiter and said fastener portion of said cover, said insulator being fitted around said spacer.

20. The method for covering a vehicle engine of claim 17, wherein said fastener-passing aperture is formed through a fastener portion of said engine cover and wherein said insulator is fitted between said shoulder of said elongated fastener and said fastener portion of said cover and a second insulator fitted between said first shoulder of said load limiter and said fastener portion of said cover, said insulators being fitted around said spacer.

* * * * *